United States Patent
Takafuji

(10) Patent No.: US 7,916,007 B2
(45) Date of Patent: Mar. 29, 2011

(54) VEHICULAR PEDESTRIAN COLLISION DETECTION SENSOR

(75) Inventor: Tetsuya Takafuji, Anjo (JP)

(73) Assignee: Denso Corporation, Kariya (JP)

( * ) Notice: Subject to any disclaimer, the term of this patent is extended or adjusted under 35 U.S.C. 154(b) by 342 days.

(21) Appl. No.: 12/006,495

(22) Filed: Jan. 3, 2008

(65) Prior Publication Data

US 2008/0164986 A1 Jul. 10, 2008

(30) Foreign Application Priority Data

Jan. 5, 2007 (JP) .................................. 2007-000701

(51) Int. Cl.
- *B60Q 1/00* (2006.01)
- *B60R 22/00* (2006.01)
- *B60R 21/16* (2006.01)
- *B60K 28/10* (2006.01)

(52) U.S. Cl. ........... 340/436; 701/45; 180/274; 280/734

(58) Field of Classification Search .................. 340/436; 701/45, 301; 180/274; 280/734

See application file for complete search history.

(56) References Cited

U.S. PATENT DOCUMENTS

| | | | |
|---|---|---|---|
| 6,308,554 B1 * | 10/2001 | Mattes et al. | 73/1.37 |
| 6,744,354 B2 * | 6/2004 | Stephan et al. | 340/436 |
| 6,784,792 B2 * | 8/2004 | Mattes et al. | 340/436 |
| 6,802,556 B2 * | 10/2004 | Mattsson et al. | 296/187.09 |
| 7,303,041 B2 * | 12/2007 | Stuve | 180/274 |
| 7,415,337 B2 * | 8/2008 | Hau et al. | 701/45 |
| 7,631,565 B2 * | 12/2009 | Tanabe | 73/862.474 |
| 2004/0186643 A1 | 9/2004 | Tanaka et al. | |
| 2005/0021192 A1 | 1/2005 | Takafuji et al. | |
| 2005/0104721 A1 | 5/2005 | Mae et al. | |
| 2006/0100763 A1 | 5/2006 | Tanabe | |
| 2006/0131900 A1 * | 6/2006 | Lu et al. | 293/117 |
| 2006/0185923 A1 | 8/2006 | Tanabe | |
| 2007/0027584 A1 * | 2/2007 | Hau et al. | 701/1 |
| 2009/0050395 A1 * | 2/2009 | Hosokawa et al. | 180/274 |

FOREIGN PATENT DOCUMENTS

| | | |
|---|---|---|
| EP | 1 710 131 | 10/2006 |
| JP | 11-028994 | 2/1999 |
| JP | 2005-053425 | 3/2005 |

OTHER PUBLICATIONS

Office action dated Jul. 14, 2009 in corresponding German Application No. 10 2007 060 000.5.

Notice of Reasons for Rejection dated May 6, 2010 in corresponding Japanese Application No. 2007-000701 with English translation thereof.

* cited by examiner

*Primary Examiner* — Benjamin C Lee
*Assistant Examiner* — Sigmund Tang
(74) *Attorney, Agent, or Firm* — Harness, Dickey & Pierce, PLC

(57) ABSTRACT

A vehicular pedestrian collision detection sensor detects a collision with a pedestrian which allows high-accuracy recognition of a collision with a pedestrian. A large number of load detection cells are arranged in a lateral direction (width direction) of the front side of a vehicle. The total collision load is calculated with respect to a cell group composed of some of the load detection cells which are adjacent to each other, wherein the cell group has a width generally equal to a pedestrian width. Based on the total collision load, an amount correlated to the mass of a pedestrian is calculated. When the amount correlated to the pedestrian mass is within a preset range, a collision with a pedestrian is recognized or determined.

9 Claims, 4 Drawing Sheets

US 7,916,007 B2

VEHICULAR PEDESTRIAN COLLISION DETECTION SENSOR

CROSS REFERENCE TO RELATED APPLICATION

This application is based on and incorporates herein by reference Japanese Patent Application No. 2007-701 filed on Jan. 5, 2007.

FIELD OF THE INVENTION

The present invention relates to a vehicular pedestrian collision detection sensor for detecting a collision with a pedestrian.

BACKGROUND OF THE INVENTION

A technology for detecting a collision between a vehicle and a pedestrian is disclosed in each of Patent Documents 1 and 2 shown below. In such a technology for detecting a vehicle-pedestrian collision, what is important is to recognize whether or not an object colliding with a vehicle is a pedestrian.

In Patent Document 1 of a patent owned by the present applicant, it is disclosed to perform the recognition of a pedestrian based on both of a collision load and a collision width. Specifically, to detect the collision width, a large number of pressure sensors are arranged in a bumper in a longitudinal direction thereof. By regarding the total sum of collision loads detected by the respective pressure sensors as a collision load resulting from a collision object, a collision mass is calculated from the collision load and from a vehicle velocity measured by a vehicle velocity sensor. In addition, the width of the collision object (referred to as the collision width) is calculated from the total width of the pressure sensors in each of which the collision load (or collision mass) exceeds a predetermined threshold value. When the calculated width falls within a predetermined range, a collision with a pedestrian is recognized.

On the other hand, Patent Document 2 discloses recognition of a pedestrian from the detected collision width.

Patent Document 1: JP-2005-053473 A (corresponding to US2005/0021192)

Patent Document 2: EP No. 1710131

When the collision object is only one pedestrian, there is no problem in detecting the width of a pedestrian by either of the methods of Patent Documents 1, 2 shown above. However, a case may be assumed in which a vehicle collides with multiple pedestrians generally at the same time. In such a case, since the detected width of the collision objects exceeds the preset assumed width of a pedestrian, it is impossible to recognize that the collision objects are pedestrians. As a result, the drawback has been found that an erroneous determination may be made.

SUMMARY OF THE INVENTION

The present invention has been achieved in view of the foregoing problem and an object of the present invention is to provide a vehicular sensor for detecting a collision with a pedestrian which allows an improvement in the accuracy of pedestrian recognition.

According to an example of the present invention, a pedestrian collision detection sensor for detecting a collision between a vehicle and a pedestrian is provided as follows. A plurality of load detection cells are included as being arranged with predetermined pitches in a lateral direction of a front side of the vehicle to output individual load signals in accordance with collision loads. A controller is included as having a pedestrian determination unit configured to (i) calculate a total sum of collision loads to a load detection cell group or an amount correlated to the total sum based on collision signals outputted from the load detection cell group, the load detection cell group including load detection cells, which are included in the plurality of load detection cells and arranged within a predetermined width, and (ii) determine whether or not a collision object is a pedestrian based on the calculated total sum of the collision loads to the load detection cell group or the amount correlated to the total sum.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A specific description will be given hereinbelow to the preferred embodiments of a vehicular pedestrian collision detection sensor for detecting a collision with a pedestrian according to the present invention.

(Description of Overall Structure)

Figure 1:
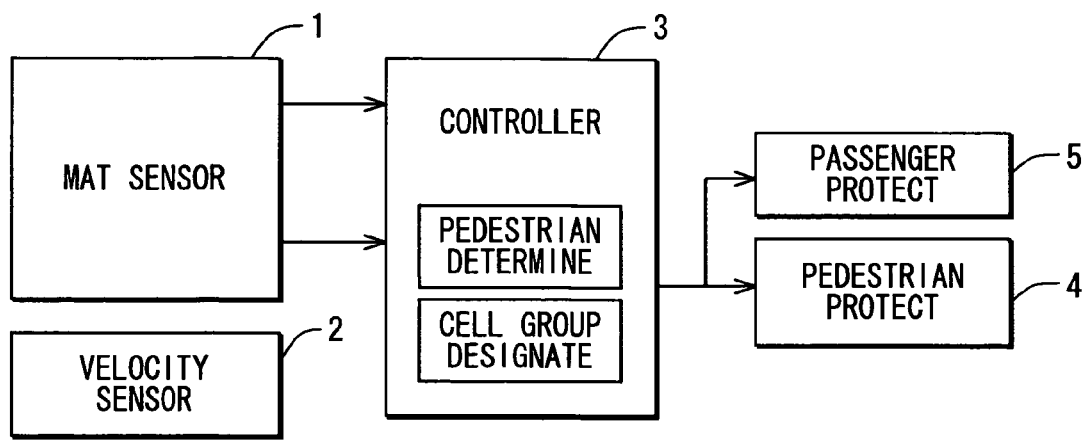
FIG. 1 is a block diagram showing a structure of a vehicular collision protection device using a vehicular sensor for detecting a collision with a pedestrian according to an embodiment of the present invention.
Figure 2:
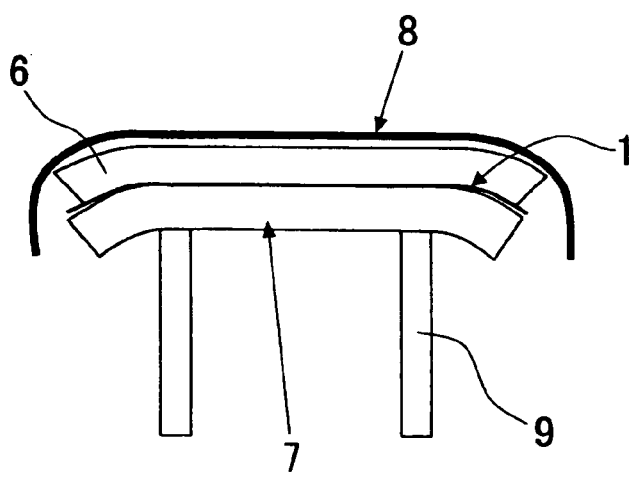
FIG. 2 is a schematic transverse cross-sectional view showing the placement of the vehicular sensor of FIG. 1.

FIGS. 1 and 2 show a structure of a vehicular collision protection device using the vehicular sensor for detecting a collision with a pedestrian according to the present embodiment, of which FIG. 1 is a block diagram thereof and FIG. 2 is a schematic transverse cross-sectional view showing the placement of the vehicular sensor for detecting a collision with a pedestrian.

The vehicular collision protection device provided in a subject vehicle includes a mat sensor 1 having a row of load detection cells, a vehicle velocity sensor 2, a controller 3, which serves as a collision protection controller, composed of a microcomputer, a pedestrian protection device 4, and a passenger protection device 5. The mat sensor 1 and the controller 3 constitute a so-called vehicular sensor for detecting a collision with a pedestrian. The controller 3 detects a collision with a pedestrian based on information obtained from the mat sensor 1 and from the vehicle velocity sensor 2, while activating the known pedestrian protection device 4 and the passenger protection device 5 upon detecting a collision with a pedestrian.

The mat sensor 1 is positioned between a bumper absorber 6 and a bumper reinforce 7 of the vehicle to extend laterally (i.e., in a vehicle-width direction). When a pedestrian collides with a predetermined portion of a bumper cover 8, an impact load is transmitted from the predetermined portion of the deformed bumper cover 8 through the bumper absorber 6 immediately therebehind to act on one of load detection cells 5 located immediately therebehind. It can be considered that the impact load resulting from the collision with a pedestrian acts on only the one of the numerous load detection cells of the mat sensor 1 that is located immediately behind the pedestrian. The rigidity of each of the bumper cover 8 and the bumper absorber 6 is set to be in a range which allows a collision load to be transmitted only to the foregoing load detection cell located immediately behind the pedestrian, and the rigidity of each of the bumper cover 8 and the bumper absorber 6 is normally in this range. Further, a side member 9 is illustrated.

Figure 3:
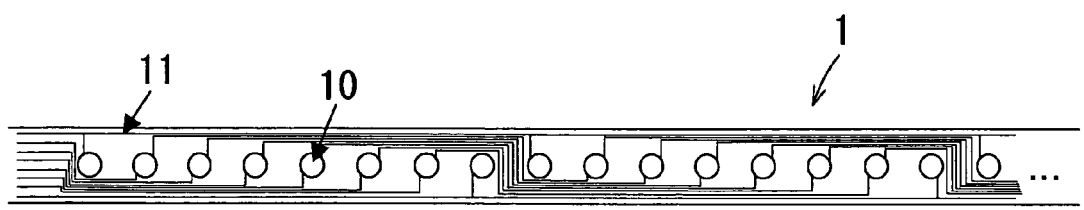
FIG. 3 is a front view of a mat sensor.

Referring to FIG. 3, the mat sensor 1 will be described. FIG. 3 is a font view of the mat sensor 1. The mat sensor 1 is formed in a belt-like shape, and the numerous load detection cells 10 are arranged in a lateral row. The mat sensor 1 includes a belt-like flexible circuit board, and respective analog multiplexers (not shown) are disposed on the both ends of the flexible circuit board. A set of wires 11 is provided for connecting the individual load detection cells 10 and the analog multiplexers. The load detection cells 10 are each energized with a constant current through the set of wires 11 so that voltage drops in the respective load detection cells 10 are outputted to the analog multiplexers via the set of wires 11.

These analog multiplexers individually select inputs in time sequence at short intervals of less than sub-milliseconds and send the selected inputs to an AD (Analog/Digital) converter not shown. The AD converter converts each of the input signals to a digital signal and outputs the digital signal to the controller 3 with the embedded microcomputer.

The processing of the output signals from the individual load detection cells 10 described above is not limited to the embodiment described above. It is possible to adopt another circuit processing technique as long as it allows the output signal from each of the load detection cells 10 to be outputted as a digital signal to the controller 3 within a time range which does not cause a problem in the recognition of a collision with a pedestrian.

For example, it is possible to provide sample hold circuits which repeatedly perform sample holding at predetermined intervals for the respective load detection cells 10 on a one-by-one basis in the stages preceding the analog multiplexers so that the analog multiplexers output the respective hold voltages of the sample hold circuits in time sequence to the AD converter. Otherwise, it is also possible to provide the AD converters for the respective load detection cells 10 on a one-by-one basis.

Figure 4:
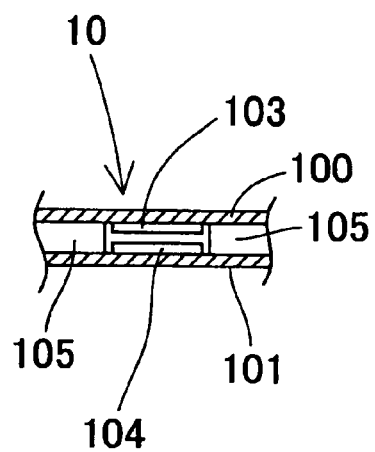
FIG. 4 is a schematic vertical cross-sectional view of each of load detection cells.

An example of each of the load detection cells 10 used in the embodiment will be described with reference to FIG. 4. The load detection cell 10 is a typical film-type load sensor in which electrode layers (not shown) are provided in opposing relation with a given lateral pitch on the respective inner surfaces of a pair of base films 100 and 101 formed of polyester each in a belt-like shape. On the respective electrode layers, pressure-sensitive ink layers 103 and 104 are further formed. Spacers 105 are provided for isolating at least either-side ones of the numerous pairs of electrode layers which are arranged in a lateral row. The spacers 105 are, e.g., a belt-like rubber layer in which circular holes are provided with a given pitch. The spacers 105 assure a predetermined gap between the opposing pressure-sensitive ink layers 103 and 104 when no load is acting on the base film 100.

As the pressure-sensitive ink layers 103 and 104, known film-type pressure sensors can be adopted, such as pressure-sensitive rubber layers which are vulcanization molded by kneading conductive particles in rubber or pressure-sensitive ink layers composed of a paste, a gel, a sol, or a foamed layer each containing a conductive ink. The placement of the mat sensor 1 is not limited to the above. It will easily be appreciated that the mat sensor 1 can be placed at another position as long as lateral distribution of the collision load is in a tolerable range.

(Arrangement Pitch of Load Detection Cells 10)

Figure 5:
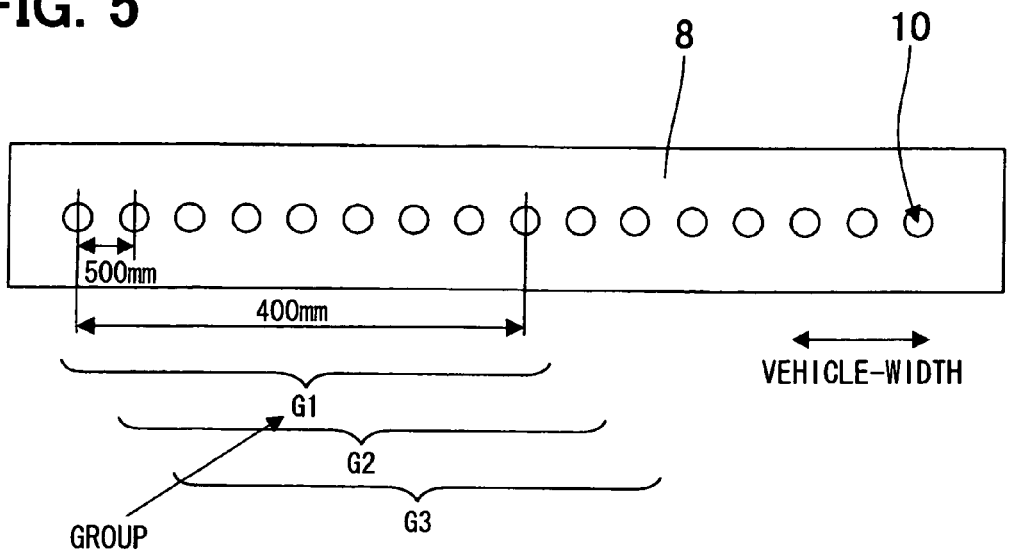
FIG. 5 is a view illustrating the arrangement pitch of the load detection cells.

The arrangement pitch of the load detection cells 10 will be described with reference to FIG. 5. FIG. 5 is a view illustrating the arrangement of the load detection cells 10.

Each of the pressure-sensitive ink layers 103 and 104 of the load detection cells 10 has a circular shape having an effective pressure-sensitive radius of about 30 mm when viewed from the front side. The arrangement pitch of the load detection cells 10 is set to 50 mm.

In the present embodiment, group separation (grouping) or detection cell group designation is performed to collect nine adjoining load detection cells 10 to thereby form or designate one cell group (e.g., G1, G2, G3, . . . ), as shown in FIG. 5. Thus, any one cell group (e.g., G1) includes eight common load detection cells 10 shared by a next adjacent cell group (e.g., G2). Accordingly, when the total number of the load detection cells 10 is assumed to be N, it follows that (N−9+1) cell groups are formed. The group separation or detection cell group designation is performed by the controller 3 in an operation explained below; namely, the controller 3 can be function as a detection cell group designation means or unit.

(Operation of Detecting Collision with Pedestrian)

Figure 6:
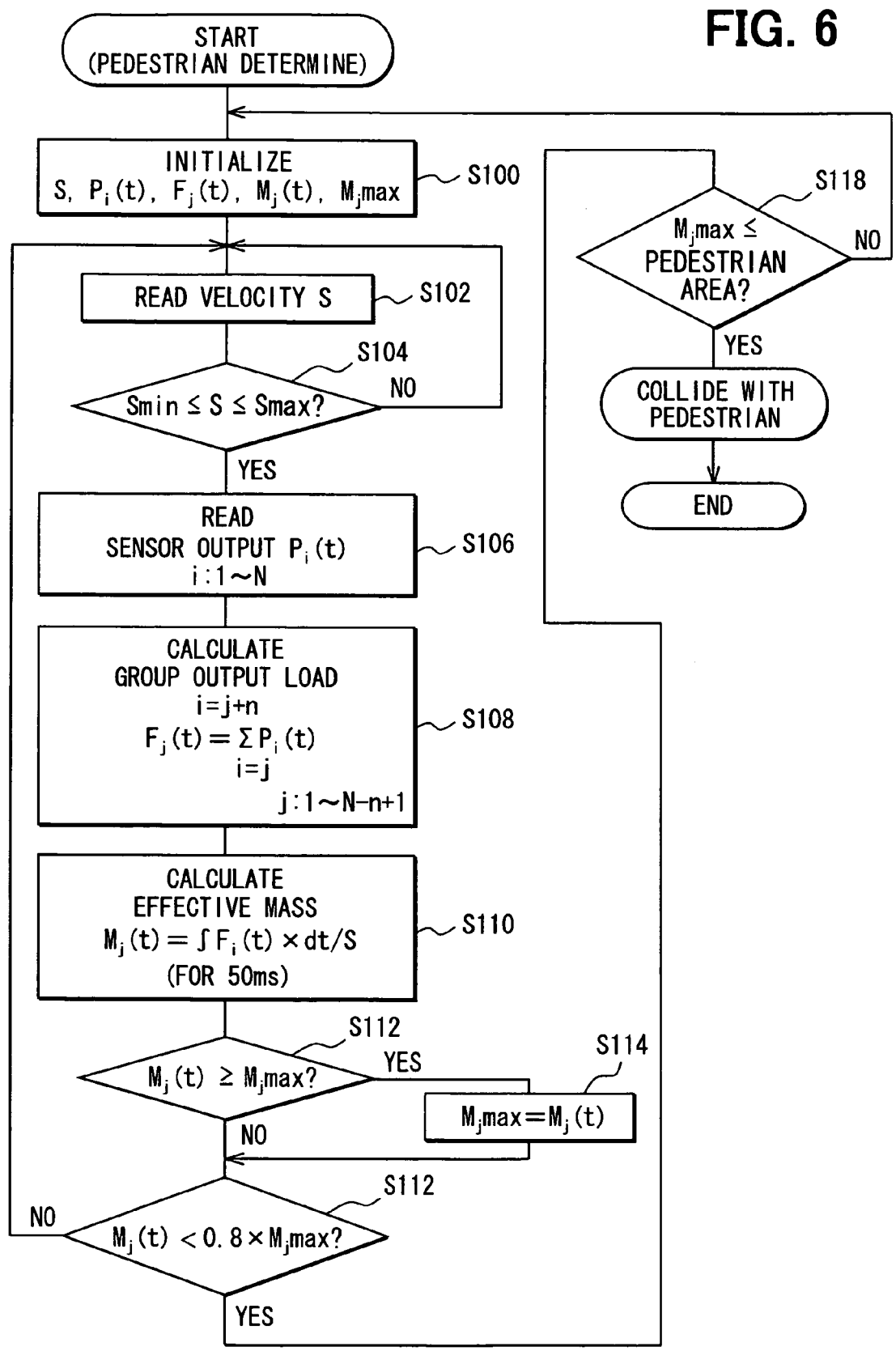
FIG. 6 is a flow chart showing an operation of detecting a collision with a pedestrian.

Next, a description will be given to the operation of detecting a collision with a pedestrian performed by the controller 3 (i.e., functioning as a pedestrian determination unit) with the embedded microcomputer with reference to the flow chart shown in FIG. 6.

First, reset initialization is performed with the starting of the operation (S100). Then, a vehicle velocity signal S proportional to the vehicle velocity is read from the vehicle velocity sensor 2 (S102) and it is examined whether or not the vehicle velocity is within a predetermined vehicle-velocity range of Smin to Smax (S104). When the vehicle velocity is outside the range, the whole process flow returns to the Step S102. This is because the detection of a collision with a pedestrian is important only within a certain vehicle velocity range. When the vehicle velocity is within the predetermined vehicle velocity range of Smin to Smax, the respective outputs Pi(t) of the load detection cells 10 are all read (S106). It is to be noted that i is 1 to N (N is an integer) and set herein to 16.

Next, a total collision load Fj(t) is calculated for each of the cell groups by summing up the outputs Pi(t) of the load detection cells 10 belonging to the individual cell groups on a per cell-group basis (S108); namely, the processing at S108 by the controller 3 functions as a detection cell group designation means or unit. Each of the calculated total collision loads F(j) is integrated with time. By dividing the resulting integral value by the vehicle velocity, a collision mass Mj(t) is calculated for each of the cell groups (S110). To eliminate the influence of an error in each of the sensors or the like, the time integration, an integral interval of 50 ms, which is sufficient for the recognition of the phenomenon of a collision with a pedestrian, is used herein. It is to be noted that j is the number of the cell groups.

Next, it is determined whether or not the collision mass Mj(t) of each of the cells groups is equal to or more than the maximum value Mjmax of the previous collision masses Mj(t) (S112). When the collision mass Mj(t) is over the maximum value Mjmax, the maximum value Mjmax is written as the collision mass Mj(t) of the cell group in a register (S114), and then the whole process flow advances to Step S116. When the collision mass Mj(t) is not over the maximum value Mjmax, the whole process flow advances directly to the Step S116.

In the Step S116, it is determined whether or not the collision mass Mj(t) of each of the cell groups is less than 80% of the maximum value Mjmax on a per cell-group basis. When the collision mass Mj(t) is not less than 80% of the maximum value Mjmax, the whole process flow returns to the Step S102. By the Steps S112 to S116, the respective peak values of the previous collision masses Mj(t) of the individual cell groups are stored in the register of the microcomputer for holding the collision masses Mj(t) on a per cell-group basis. By the Step S116, it is verified that the collision mass Mj(t) has attenuated to a value less than 80% of the maximum value Mjmax thereof.

In a normal collision with a pedestrian, the waveform of the collision mass Mj(t) is a single-peak waveform. Therefore, after the attenuation of the collision mass Mj(t) from the maximum value Mjmax thereof to a value less than 80% of the maximum value Mjmax, the collision mass Mj(t) will not increase again to a value more than the current value.

After it is verified that each of the collision masses Mj(t) has attenuated to a value less than 80% of the maximum value Mjmax, it is determined whether or not any of the maximum values Mjmax of the individual cell groups is within a predetermined threshold value range (S118). When any of the maximum values Mjmax is within the predetermined range, a collision with a pedestrian is recognized or determined (S120); namely, the process at S120 or all the processing in FIG. 6 by the controller 3 functions as a pedestrian determination means or unit. The whole process flow then returns to a main routine (not shown).

It is to be noted that the predetermined threshold value range mentioned above has been pre-set to a numerical range including the mass of an infant through the mass of a large-built male.

(Effect)

According to the embodiment described above, the collision mass Mj(t) is calculated based on the total collision loads of the cell groups arranged to have respective widths which are adjacent to each other and each approximately equal to the width of a pedestrian, a detection error will not result from the addition of an extra mass to the collision mass Mj(t) in a comparison between the collision mass Mj(t) and the assumed pedestrian threshold value range. As a result, it is possible to recognize or determine whether or not a collision object is a pedestrian more accurately than with a conventional detection technology.

(Optimum Pedestrian Width)

Although the lateral width of each of the cell groups set in the embodiment described above is 40 cm, the setting of the number of the load detection cells 10 included in each of the cell groups, i.e., the assumed pedestrian width is extremely important. When the set number or width is excessively large, an extra output is added to the total collision load and the detection sensitivity lowers. When the set number or width is excessively small, there may be a case where a collision object having a small lateral width, such as a road sign pole, is erroneously recognized as a pedestrian.

Figure 7:
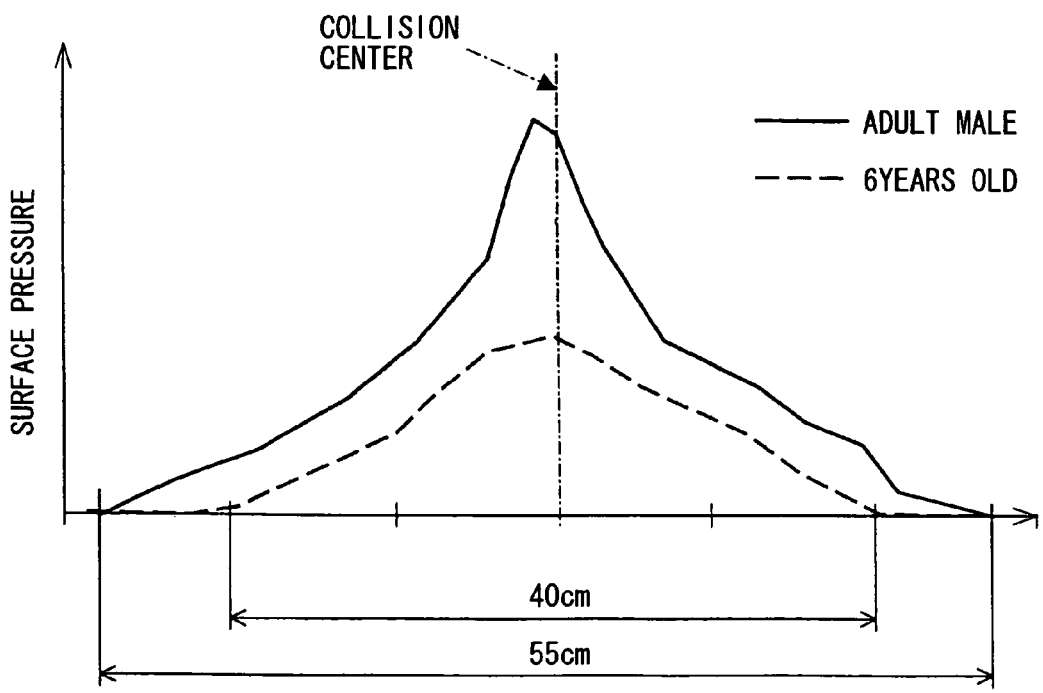
FIG. 7 is an actual measurement view showing an example of the distribution of contact pressure upon collision with a pedestrian.

FIG. 7 shows an example of the lateral distributions of contact pressure generated upon collision with an object corresponding to an average adult male and upon collision with an object corresponding to an average sixth-year-old child. The distributions of contact pressure were generated at the surface of a bumper R/F when the material of the bumper absorber was expanded PP and the thickness thereof was about 80 mm. In this case, the distribution of the child is about 40 cm and the distribution of the adult male is 55 cm. The distribution is preferably set in accordance with each bumper because it varies in accordance with the shape of the top cover of the bumper, the thickness of the bumper absorber, and the rigidity thereof. When the distribution is set in accordance with the width of the child, a large load can be mostly covered even in the case with the male adult, so that it is preferable to set the distribution to the vicinity of 40 cm in the case of the example shown in FIG. 7. Accordingly, the lateral width of each of the cell groups is set to the range of at least 20 to 60 cm, preferably 30 to 50 cm, or more preferably 35 to 45 cm. The arrangement pitch of the load detection cells 10 is adjusted to be at least 10 cm or less, preferably 7 cm or less, or more preferably 5 cm or less.

(Other Variation)

In the embodiment described above, the numerous cell groups each corresponding to the width of a pedestrian are preset and the collision masses Mj(t) are obtained for the individual cell groups on a per cell-group basis. Otherwise, it is possible to, e.g., determine a maximum value in the collision load distribution in the lateral direction of a vehicle that has been obtained from the individual load detection cells 10, assume respective widths, each corresponding to one-half of the assumed pedestrian width, on both sides of the maxim value, add up the outputs of the load detection cells 10 included in the respective widths on both sides, and provide the result of the addition as the total collision load.

Otherwise, it is also possible to extract all the cell groups each including the number of the load detection cells which at least output the collision loads and are adjacent to each other to correspond to a pedestrian width and then calculate the total collision load for each of the cell groups.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

(Aspects)

Aspects of the disclosure described herein are set out in the following clauses.

A vehicular pedestrian collision detection sensor for detecting a collision with a pedestrian is provided as follows. A plurality of load detection cells are included as being arranged with predetermined pitches in a lateral direction of a front side of the vehicle to output individual load signals in accordance with collision loads. A controller is included as having a pedestrian determination unit configured to (i) calculate a total sum of collision loads to a load detection cell group or an amount correlated to the total sum based on collision signals outputted from the load detection cell group, the load detection cell group including load detection cells, which are included in the plurality of load detection cells and arranged within a predetermined width, and (ii) determine whether or not a collision object is a pedestrian based on the calculated total sum of the collision loads to the load detection cell group or the amount correlated to the total sum.

It is assumed that one pair of the load detection cells disposed at the both ends of the load detection cell group are arranged with the predetermined width. It is also assumed that the predetermined width is approximately equal to a pedestrian width. The several load detection cells included in the load detection cell group are assumed to output the load signals of not less than a predetermined threshold value upon collision with a pedestrian assumed as a model. As the pedestrian assumed as the model, a pedestrian who is small-built to a degree is preferred.

That is, a technology for detecting a collision with a pedestrian is characterized in that it calculates the total sum of collision loads distributed over a width corresponding to the predetermined width from a collision load distribution detected in the lateral direction of the front side of the vehicle, regards the total sum as a collision load obtained from a collision, and recognizes the collision based on the sum of the collision loads. Accordingly, the numerous laterally arranged load detection cells may be any sensors as long as they output the collision load distribution in the lateral direction of the front side of the vehicle. In other words, the load detection cells mentioned above indicate the portions of the sensors which output local collision loads on predetermined portions.

With the arrangement, even when multiple collision objects collide substantially simultaneously with the numerous load detection cells arranged in the lateral direction of the front side (e.g., bumper) of the vehicle, a recognition can be made by distinguishing therebetween. As a result, it is possible to solve the problem that a collision object is not recognized as pedestrians for the reasons of an excessively large collision width and an excessively large total collision load. Moreover, because the total collision load is calculated only with the predetermined width, even when any of the load detection cells located in an area different from the collision area outputs a collision load as a result of any fault or a collision with an obstacle, the accuracy of recognition of a collision with a pedestrian is not lowered thereby.

Further, the pedestrian determination unit may be configured to calculate a mass-correlated amount which is an amount having a correlation to a mass based on the calculated total sum of the collision loads or on the amount correlated thereto in accordance with a method stored in advance, recognize whether or not the mass-correlated amount is within a predetermined assumed pedestrian-mass range stored in advance, and recognize a collision with a pedestrian when the mass-correlated amount is within the assumed pedestrian-mass range.

That is, the technology for detecting a collision with a pedestrian is characterized in that it recognizes a collision with a pedestrian by calculating the total sum of collision loads distributed over a width corresponding to a predetermined assumed pedestrian width from the distribution of collision loads detected in the lateral direction of the front side of the vehicle, regarding the total sum as the collision load obtained from, e.g., a collision with a pedestrian, and recognizing, e.g., whether or not the mass-correlated amount obtained based on the total sum of the collision loads is within the assumed range of pedestrian mass.

With the arrangement, even when multiple pedestrians collide substantially simultaneously with the numerous load detection cells arranged in the lateral direction of the front side of the vehicle, a recognition can be made by distinguishing therebetween. As a result, it is possible to solve the conventional problem that pedestrians are not determined as such for the reasons of an excessively large collision width and an excessively large total collision load. Moreover, because the total collision load is calculated only with the width assumed to be the pedestrian width, even when only one pedestrian collides and any of the load detection cells located in an area different from the pedestrian collision area outputs a collision load as a result of any fault or a collision with an obstacle, the accuracy of recognition of a collision with a pedestrian is not lowered thereby.

Further, the pedestrian determination unit may be configured to (i) designate multiple load detection cell groups from the plurality of load detection cells, each load detection cell group including mutually adjoining load detection cells arranged within the predetermined width approximately equal to a pedestrian width, the each load detection cell group including at least one load detection cell, which is not included in other load detection cell groups, (ii) calculate a total sum of collision loads to each of the load detection cell groups or an amount correlated to the total sum, (iii) use the calculated total sum or the amount correlated to the total sum as a variable with respect to the each of the load detection cell groups, (iv) use a value having a correlation to a mass as a function value with respect to the each of the load detection cell groups, (v) input the total sums or the amounts correlated to the total sum to a predetermined function to calculate the function value with respect to the each of the load detection cell groups, (vi) determine whether or not any one of the function values calculated with respect to the individual load detection cell groups is within a predetermined range assumed at a time of a collision with a pedestrian, and (vii) determine a collision with a pedestrian when the any one of the function values is within the predetermined range.

That is, in the implementation, predetermined ranges with specified lateral widths are set at varied lateral positions, the total collision loads are calculated for the respective specified widths of the individual positions, and a collision with a pedestrian is recognized when at least one of the amounts correlated to the total collision loads is within a range corresponding to a collision with a pedestrian.

More specifically, the load detection cells may be separated into multiple groups by assuming that several load detection cells, which are arranged within the specified width approximately equal to the pedestrian width, form each of the multiple groups. Preferably, each of the load detection cells can be and should be included in the multiple groups as group constituents. The total collision load of the load detection cells as the constituents is calculated for each of the groups and an amount having a correlation to the total collision load is calculated in accordance with a method stored in advance. The amount is assumed to be a collision mass at the time of a collision with a pedestrian or an amount having a strong correlation thereto.

With the arrangement, even when multiple pedestrians collide substantially simultaneously with the numerous load detection cells arranged in the lateral direction of the front side of the vehicle, a recognition can be made by distinguishing therebetween. As a result, it is possible to solve the conventional problem that pedestrians are not recognized as such for the reasons of an excessively large collision width and an excessively large total collision load. Moreover, because the total collision load is calculated only with the width assumed to be the pedestrian width, even when only one pedestrian collides and any of the load detection cells located in an area different from the pedestrian collision area outputs a collision load as a result of any fault or a collision with an obstacle, the accuracy of recognition of a collision with a pedestrian is not lowered thereby.

Further, the pedestrian determination unit may be configured to receive a velocity of the vehicle based on an inputted vehicle velocity signal, calculate an effective mass of a collision object based on the total collision loads of the individual cell groups and on the velocity, and use the effective mass as the function value. In the arrangement, pedestrian recognition is performed based on the mass corresponding to the mass of the pedestrian. As a result, the influence of variations in collision load due to the vehicle velocity or the like can be ignored.

Further, the pedestrian determination unit may be configured to use the maximum value of the effective mass within a predetermined short period as the function value. With the arrangement, it is possible to perform high-accuracy recognition of a collision with a pedestrian irrespective of the complicated and abruptly changing waveforms of the collision loads which are outputted from the load detection cells upon collision with a collision object.

Further, the load detection cells may be arranged with a given pitch of at least 10 cm or less and the predetermined width may be set to 20 to 60 cm. The arrangement allows the accuracy of recognition of a collision with a pedestrian to be improved compared with conventional accuracy.

Further, the load detection cells may be arranged with a given pitch of at least 10 cm or less and the predetermined width may be set to 30 to 50 cm. The arrangement allows the accuracy of recognition of a collision with a pedestrian to be further improved compared with the conventional accuracy.

Further, the load detection cells may be arranged with a given pitch of at least 10 cm or less and the predetermined width may be set to 35 to 45 cm. The arrangement allows the accuracy of recognition of a collision with a pedestrian to be still further improved compared with the conventional accuracy.

Yet further, the predetermined range of the function value at the time of a collision with a pedestrian may be set to be larger with respect to the load detection cell groups disposed at the center portion of the bumper than to the load detection cell groups disposed at the lateral ends of the bumper.

The collision loads outputted from the load detection cells in response to the same impact force upon collision with a pedestrian tend to be larger at the center of the front side of a vehicle than at the both lateral end portions thereof due to, e.g., local differences in the rigidity and shape of the bumper or the like. With the arrangement, it is therefore possible to suppress a reduction in the accuracy of recognition of a collision with a pedestrian due to the varying collision load according to the position of collision. Even when an amplification factor for the output signals from the load detection cells is varied at the central portion and at the lateral end portions, instead of changing the predetermined range of the function values as described above, substantially the same effect is achieved.

Further, it is assumed that each of the load detection cells is a known film-type pressure sensor. The arrangement allows integral and simultaneous production of the individual load detection cells and the set of wires thereof. As a result, it is possible to improve the reliability and simplify the production process steps. As the film-type pressure sensor, there can be adopted a known conductive-rubber pressure sensor which is vulcanization molded by kneading conductive particles in rubber or a known conductive-ink pressure sensor composed of a paste, a gel, a sol, or an expanded layer containing a conductive powder mixture (also referred to as a conductive ink) which is sandwiched between a pair of conductive electrodes. The film-type pressure sensors arranged in a lateral direction of the bumper may be arranged at any portions of a bumper cover, a bumper absorber, and a bumper reinforce, each composing the bumper, as long as it can detect the collision load. For example, the film-type pressure sensors can be disposed between the bumper cover and the bumper absorber or between the bumper absorber and the bumper reinforce.

It is possible to form the film-type pressure sensors and wires connecting the film-type pressure sensors to an IC for calculation on a flexible circuit board. It is also possible to mount the IC for calculation on the flexible circuit board. The arrangement makes it possible to simplify the structure of the device, particularly the wires.

Instead of calculating the mass of a collision object from the total collision loads and from the vehicle velocity, it is also possible to correct the threshold value range to be compared with the mass by using the vehicle velocity and compare the threshold range corrected with the vehicle velocity with the total collision loads. This is substantially the same as the calculation of the mass of the collision object described above.

It will be obvious to those skilled in the art that various changes may be made in the above-described embodiments of the present invention. However, the scope of the present invention should be determined by the following claims.

What is claimed is:

1. A pedestrian collision detection sensor for detecting a collision between a vehicle and a pedestrian, comprising:
   a plurality of load detection cells arranged with predetermined pitches in a lateral direction of a front side of the vehicle to output individual load signals in accordance with collision loads; and
   a controller having a pedestrian determination unit configured to
      calculate a total sum of collision loads to a load detection cell group or an amount correlated to the total sum based on collision signals outputted from the load detection cell group, the load detection cell group including load detection cells, which are included in the plurality of load detection cells,
         the load detection cell group including the load detection cells arranged within a predetermined width being approximately equal to a pedestrian width,
      determine whether or not a collision object is a pedestrian based on the calculated total sum of the collision loads to the load detection cell group or the amount correlated to the total sum;
   wherein the pedestrian determination unit is configured to determine the load detection cell group by designating multiple load detection cell groups from the plurality of load detection cells, each load detection cell group including mutually adjoining load detection cells arranged within the predetermined width approximately equal to the pedestrian width, the each load detection cell group including at least one load detection cell, which is not included in other load detection cell groups.

2. The pedestrian collision detection sensor according to claim 1, wherein
   the pedestrian determination unit is configured to
      calculate a mass-correlated amount, which has a correlation to a mass, based on the calculated total sum of the collision loads or the amount correlated to the total sum using a predetermined method,
      determine whether or not the mass-correlated amount is within a predetermined pedestrian-mass range, and
      determine a collision with a pedestrian when the mass-correlated amount is within the predetermined pedestrian-mass range.

3. The pedestrian collision detection sensor according to claim 1, wherein the pedestrian determination unit is configured to
- calculate a total sum of collision loads to each of the load detection cell groups or an amount correlated to the total sum,
- use the calculated total sum or the amount correlated to the total sum as a variable with respect to the each of the load detection cell groups,
- use a value having a correlation to a mass as a function value with respect to the each of the load detection cell groups,
- input the total sums or the amounts correlated to the total sum to a predetermined function to calculate the function value with respect to the each of the load detection cell groups,
- determine whether or not any one of the function values calculated with respect to the individual load detection cell groups is within a predetermined range assumed at a time of a collision with a pedestrian, and
- determine a collision with a pedestrian when the any one of the function values is within the predetermined range.

4. The pedestrian collision detection sensor according to claim 3, wherein
the pedestrian determination unit is configured to
- receive a velocity of the vehicle based on an inputted vehicle velocity signal,
- calculate an effective mass of a collision object based on the velocity and on the total sum of the collision loads to each of the load detection cell groups or the amount correlated to the total sum, and
- use the effective mass as the function value with respect to the each of the load detection cell groups.

5. The pedestrian collision detection sensor according to claim 4, wherein
the pedestrian determination unit is configured to use the maximum value of the effective mass within a predetermined short period as the function value.

6. The pedestrian collision detection sensor according to claim 1, wherein:
- the load detection cells are arranged with the predetermined pitches of at least 10 cm or less; and
- each of the load detection cell groups is arranged within the predetermined width is set to 20 to 60 cm.

7. The pedestrian collision detection sensor according to claim wherein:
- the load detection cells are arranged with the predetermined pitches of at least 10 cm or less; and
- each of the load detection cell groups is arranged within the predetermined width is set to 30 to 50 cm.

8. The pedestrian collision detection sensor according to claim 1, wherein:
- the load detection cells are arranged with the predetermined pitches of at least 10 cm or less; and
- each of the load detection cell groups is arranged within the predetermined width is set to 35 to 45 cm.

9. The pedestrian collision detection sensor according to claim 3, wherein
the predetermined range at the time of a collision with a pedestrian set for a load detection cell group disposed at a center portion of a bumper of the vehicle is larger than that set for a load detection cell group disposed at a lateral end of the bumper.

* * * * *